(12) United States Patent
Yamamoto (10) Patent No.: US 9,969,422 B2
(45) Date of Patent: May 15, 2018

(54) STEERING DEVICE (71) Applicant: JTEKT CORPORATION, Osaka-shi, Osaka (JP)

(72) Inventor: Yasuharu Yamamoto, Toyota (JP)

(73) Assignee: JTEKT CORPORATION, Osaka (JP)

( * ) Notice: Subject to any disclaimer, the term of this patent is extended or adjusted under 35 U.S.C. 154(b) by 0 days. days.

(21) Appl. No.: 15/361,175

(22) Filed: Nov. 25, 2016

(65) Prior Publication Data
US 2017/0158221 A1 Jun. 8, 2017

(30) Foreign Application Priority Data

Dec. 4, 2015 (JP) ................................ 2015-237745

(51) Int. Cl.

| | |
|---|---|
| *B62D 3/12* | (2006.01) |
| *B62D 1/04* | (2006.01) |
| *B62D 1/20* | (2006.01) |
| *B62D 5/04* | (2006.01) |
| *F16H 25/22* | (2006.01) |
| *F16H 25/24* | (2006.01) |
| *F16H 25/20* | (2006.01) |
| *F16C 29/02* | (2006.01) |
| *F16H 55/28* | (2006.01) |

(52) U.S. Cl.
CPC .............. *B62D 3/123* (2013.01); *B62D 1/04* (2013.01); *B62D 1/20* (2013.01); *B62D 3/126* (2013.01); *B62D 5/0424* (2013.01); *B62D 5/0448* (2013.01); *F16C 29/02* (2013.01); *F16H 25/20* (2013.01); *F16H 25/2209* (2013.01); *F16H 25/2454* (2013.01); *F16H 25/2204* (2013.01); *F16H 55/283* (2013.01); *F16H 2025/204* (2013.01); *F16H 2025/2062* (2013.01); *F16H 2025/2081* (2013.01); *F16H 2025/2096* (2013.01)

(58) Field of Classification Search
CPC .......... B62D 3/12; B62D 3/123; B62D 3/126
See application file for complete search history.

(56) References Cited

U.S. PATENT DOCUMENTS

| | | | |
|---|---|---|---|
| 2017/0113719 A1* | 4/2017 | Ohashi | ...................... B62D 3/12 |
| 2017/0267277 A1* | 9/2017 | Ohashi | ................... B62D 3/123 |

FOREIGN PATENT DOCUMENTS

JP 2012-144202 A 8/2012

* cited by examiner

*Primary Examiner* — Kevin Hurley
(74) *Attorney, Agent, or Firm* — Oliff PLC (57) ABSTRACT

Two flat surface portions are provided on portions of a rack shaft away from rack teeth and a back surface in the circumferential direction. The two flat surface portions are parallel to each other. A rotation stopping member has a case and a low-friction member. The hollow portion provided inside the case includes two flat surface portions that face each other in a direction Y and extend in parallel with each other, and two flat surface portions that face each other in a direction Z and extend orthogonally to the flat surface portions. A slight clearance is provided between the outer surface of the rack shaft and the inner surface of the rotation stopping member (low-friction member). The rotation stopping member is disposed on the outer periphery of the rack shaft. The outer periphery of the rotation stopping member is fixed to the inner periphery of a rack housing.

11 Claims, 8 Drawing Sheets

STEERING DEVICE

INCORPORATION BY REFERENCE

The disclosure of Japanese Patent Application No. 2015-237745 filed on Dec. 4, 2015 including the specification, drawings and abstract, is incorporated herein by reference in its entirety.

BACKGROUND OF THE INVENTION

1. Field of the Invention

The present invention relates to a steering device.

2. Description of the Related Art

There has hitherto been known an electric power steering (EPS) device in which a ball screw mechanism provides thrust in the axial direction to a rack shaft provided as a steered shaft to assist a driver in performing a steering operation. For example, Japanese Patent Application Publication No. 2012-144202 (JP 2012-144202 A) describes an EPS device in which a motor is attached in parallel with a rack shaft and a ball screw mechanism converts rotational torque of the motor into linear motion of the rack shaft to assist a driver in performing a steering operation. In this event, the rack shaft is urged to be rotated (in an accompanying manner) in response to the rotational torque of the motor. However, the rack shaft is supported by a rack-and-pinion mechanism, and prevented from rotating.

When rotation of the rack shaft is suppressed using only the rack-and-pinion mechanism, however, the surface pressure for contact between rack teeth and pinion teeth is made non-uniform by the rotational torque, and the teeth may be worn unevenly to cause a backlash or abnormal sound. In EPS devices for large vehicles which require larger rotational torque, in particular, the teeth may be worn unevenly to a further degree by the larger rotational torque. As one of measures for addressing such an issue, it is conceivable to support the rack shaft so that the rack shaft is non-rotatable by providing the back surface of the rack shaft, which is opposite to the rack teeth in the circumferential direction, with a Y-shape, and providing a support yoke of a rack guide with a shape for receiving the Y-shape. In this case, however, it is required to design and adjust the clearances of the support yoke of the rack guide in the axial direction and the radial direction with high precision, which takes a high cost and much trouble. Therefore, it is desired to support the rack shaft so that the rack shaft is non-rotatable with a simpler configuration even in the case where the rotational torque acts on the rack shaft.

SUMMARY OF THE INVENTION

It is an object of the present invention to provide a steering device capable of suppressing the rotational angle of a steered shaft in the circumferential direction.

An aspect of the present invention provides a steering device including: a steering shaft that includes a pinion shaft that has pinion teeth; a steered shaft that is reciprocally movable in an axial direction and that has a portion in which a screw groove is provided in an outer periphery, the steered shaft being provided with a first abutment portion located at a position that is away from the screw groove in the axial direction of the steered shaft; a ball screw mechanism that has a cylindrical nut threadably engaged with the screw groove via a plurality of balls, the ball screw mechanism being configured to apply a force in the axial direction to the steered shaft on a basis of rotation of the nut; a motor that applies rotational torque to the nut; a rack housing that has an insertion portion through which the steered shaft is inserted; a rack end mounted to each of both end portions of the steered shaft and coupled to a steered wheel; and a rotation stopping member provided between an outer peripheral surface of the steered shaft and an inner peripheral surface of the insertion portion and between an end surface of the rack housing against which the rack end abuts and the ball screw mechanism in the axial direction of the steered shaft, the rotation stopping member having a second abutment portion that faces the first abutment portion via a clearance and that abuts against the first abutment portion when the steered shaft is rotated in the circumferential direction.

With this configuration; the angle over which the steered shaft is rotated in the circumferential direction is suppressed with the first abutment portion abutting against the second abutment portion, which is provided on the rotation stopping member, when the steered shaft is rotated in the circumferential direction.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
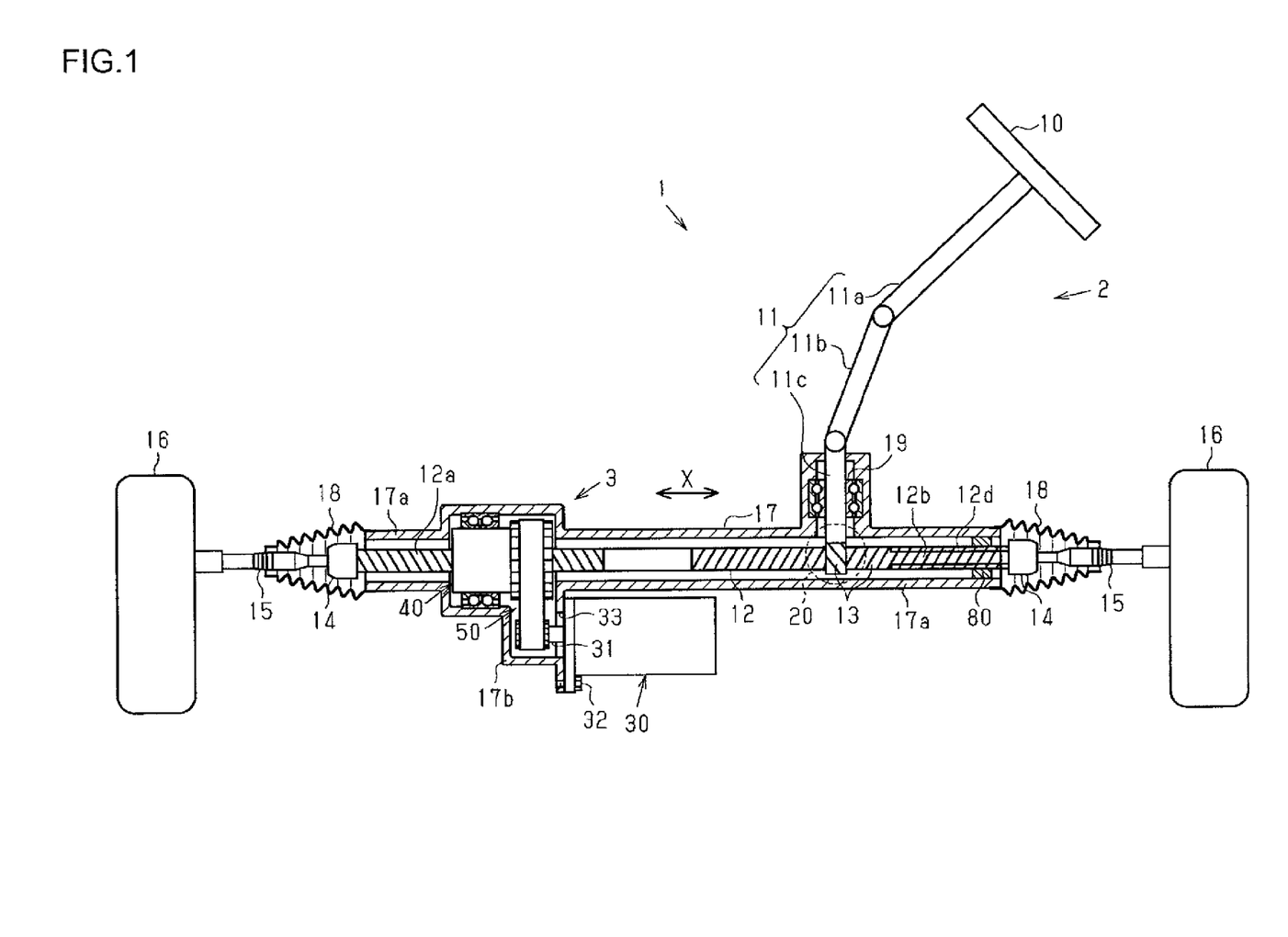
FIG. 1 is a view illustrating a schematic configuration of a steering device according to an embodiment.

An EPS device that serves as a steering device according to an embodiment of the present invention will be described below. As illustrated in FIG. 1, an EPS device 1 includes a steering mechanism 2 that steers steered wheels 16 on the basis of an operation of a steering wheel 10 performed by a driver, and an assist mechanism 3 that assists the driver in performing a steering operation.

The steering mechanism 2 includes the steering wheel 10, and a steering shaft 11 that rotates together with the steering wheel 10. The steering shaft 11 has a column shaft 11a coupled to the steering wheel 10, an intermediate shaft 11b coupled to the lower end portion of the column shaft 11a, and a pinion shaft 11c coupled to the lower end portion of the intermediate shaft 11b. The lower end portion of the pinion shaft 11c is coupled to a rack shaft 12 via a rack-and-pinion mechanism 13. The lower end portion (pinion teeth) of the pinion shaft 11c is meshed with the rack shaft 12 (rack teeth). Thus, rotational motion of the steering shaft 11 is converted into reciprocal linear motion of the rack shaft 12 in an axial direction X (the right-left direction in FIG. 1) via the rack-and-pinion mechanism 13 which is composed of the pinion teeth which are provided at the distal end of the pinion shaft 11c and the rack teeth which are provided on the rack shaft 12. The reciprocal linear motion is transferred to tie rods 15 via rack ends 14 coupled to both ends of the rack shaft 12.

The motion of the tie rods 15 is transferred to the right and left steered wheels 16 to change the steered angle of the steered wheels 16. The rack shaft 12 is housed in a rack housing 17. Rack boots 18 in a bellows tubular shape are disposed between both ends of the rack housing 17 and the tie rods 15. The pinion shaft 11c is supported so as to be rotatable with respect to the inner peripheral surface of a portion of the rack housing 17 that houses the pinion shaft 11c via a bearing 19.

The rack shaft 12 is supported inside the rack housing 17 so as to be reciprocally movable along the axial direction X in the state of being urged toward the pinion shaft 11c by a rack guide 20 provided in the rack housing 17.

The assist mechanism 3 is provided around the rack shaft 12. The assist mechanism 3 is composed of a motor 30 that serves as a generation source of an assist force, a ball screw mechanism 40 integrally attached to the periphery of the rack shaft 12, and a speed reducer 50 that transfers a rotational force of a rotary shaft 31 of the motor 30 to the ball screw mechanism 40. The assist mechanism 3 converts the rotational force of the rotary shaft 31 of the motor 30 into reciprocal linear motion in the axial direction of the rack shaft 12 via the speed reducer 50 and the ball screw mechanism 40 to assist the driver in performing a steering operation.

The ball screw mechanism 40, the speed reducer 50, the pinion shaft 11c, and the rack shaft 12 are covered by the rack housing 17. An insertion portion 17a through which the rack shaft 12 is inserted is provided to penetrate the rack housing 17 in the axial direction X. The rack housing 17 has a speed reducer housing 17b which is a portion that projects in a direction (downward in FIG. 1) that crosses the direction in which the rack shaft 12 extends. A part of the speed reducer 50 is housed inside the speed reducer housing 17b. A through hole 33 is provided in the outer wall (right side wall of the speed reducer housing 17b in FIG. 1) of the speed reducer housing 17b. The rotary shaft 31 of the motor 30 extends into the speed reducer housing 17b through the through hole 33 which is provided in the speed reducer housing 17b. The motor 30 is fixed to the speed reducer housing 17b by a bolt 32 such that the rotary shaft 31 extends in parallel with the rack shaft 12. A slight clearance is provided between the insertion portion 17a and the rack shaft 12 in the radial direction.

Figure 2:
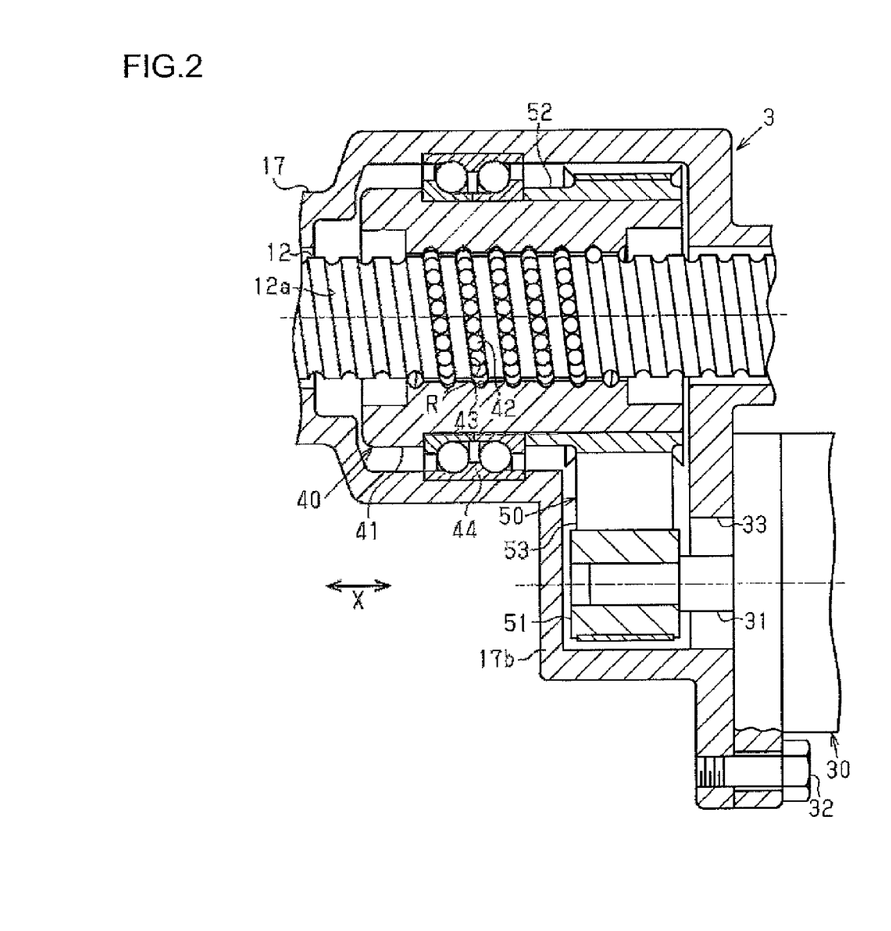
FIG. 2 is a sectional view illustrating a schematic structure of an assist mechanism of the steering device according to the embodiment.

Next, the assist mechanism 3 will be described in detail. As illustrated in FIG. 2, the ball screw mechanism 40 includes a cylindrical nut 41 threadably engaged with the rack shaft 12 via a large number of balls 42. The nut 41 is supported so as to be rotatable with respect to the inner peripheral surface of the rack housing 17 via a cylindrical bearing 44. A spiral screw groove 12a is provided in the outer peripheral surface of the rack shaft 12. A spiral screw groove 43 that corresponds to the screw groove 12a of the rack shaft 12 is provided in the inner peripheral surface of the nut 41. A spiral space surrounded by the screw groove 43 of the nut 41 and the screw groove 12a of the rack shaft 12 functions as a rolling passage R in which the balls 42 roll. Although not illustrated, the nut 41 is provided with a circulation passage that opens at two locations of the rolling passage R and that communicates the openings at the two locations. Thus, the balls 42 can endlessly circulate in the rolling passage R via the circulation passage in the nut 41.

The speed reducer 50 includes a driving pulley 51 integrally attached to the rotary shaft 31 of the motor 30, a driven pulley 52 integrally attached to the outer periphery of the nut 41, and a belt 53 wound between the driving pulley 51 and the driven pulley 52. The rotary shaft 31 of the motor 30, the driving pulley 51 which is attached to the rotary shaft 31, and a part of the belt 53 are disposed in the internal space of the speed reducer housing 17b. The belt 53 may be a toothed belt made of rubber and including a core wire, for example.

In the thus configured assist mechanism 3, when the rotary shaft 31 of the motor 30 is rotated, the driving pulley 51 is rotated together with the rotary shaft 31. The rotation of the driving pulley 51 is transferred to the driven pulley 52 via the belt 53 so that the driven pulley 52 is rotated. Therefore, the nut 41 which is integrally attached to the driven pulley 52 is also rotated together. With the nut 41 rotated relative to the rack shaft 12, the large number of balls 42 which are interposed between the nut 41 and the rack shaft 12 receive a load from both the nut 41 and the rack shaft 12 to endlessly circulate in the rolling passage R. With the balls 42 circulating endlessly, rotational torque applied to the nut 41 is converted into a force to be applied in the axial direction X of the rack shaft 12. Therefore, the rack shaft 12 is moved in the axial direction X with respect to the nut 41. The force in the axial direction X applied to the rack shaft 12 serves as an assist force to assist the driver in performing a steering operation.

Next, the configuration of the rack ends 14 which are provided at end portions of the rack shaft 12 will be described. The two end portions (rack ends 14) of the rack shaft 12 have the same configuration except that they are inverted in a right-left direction.

Figure 3:
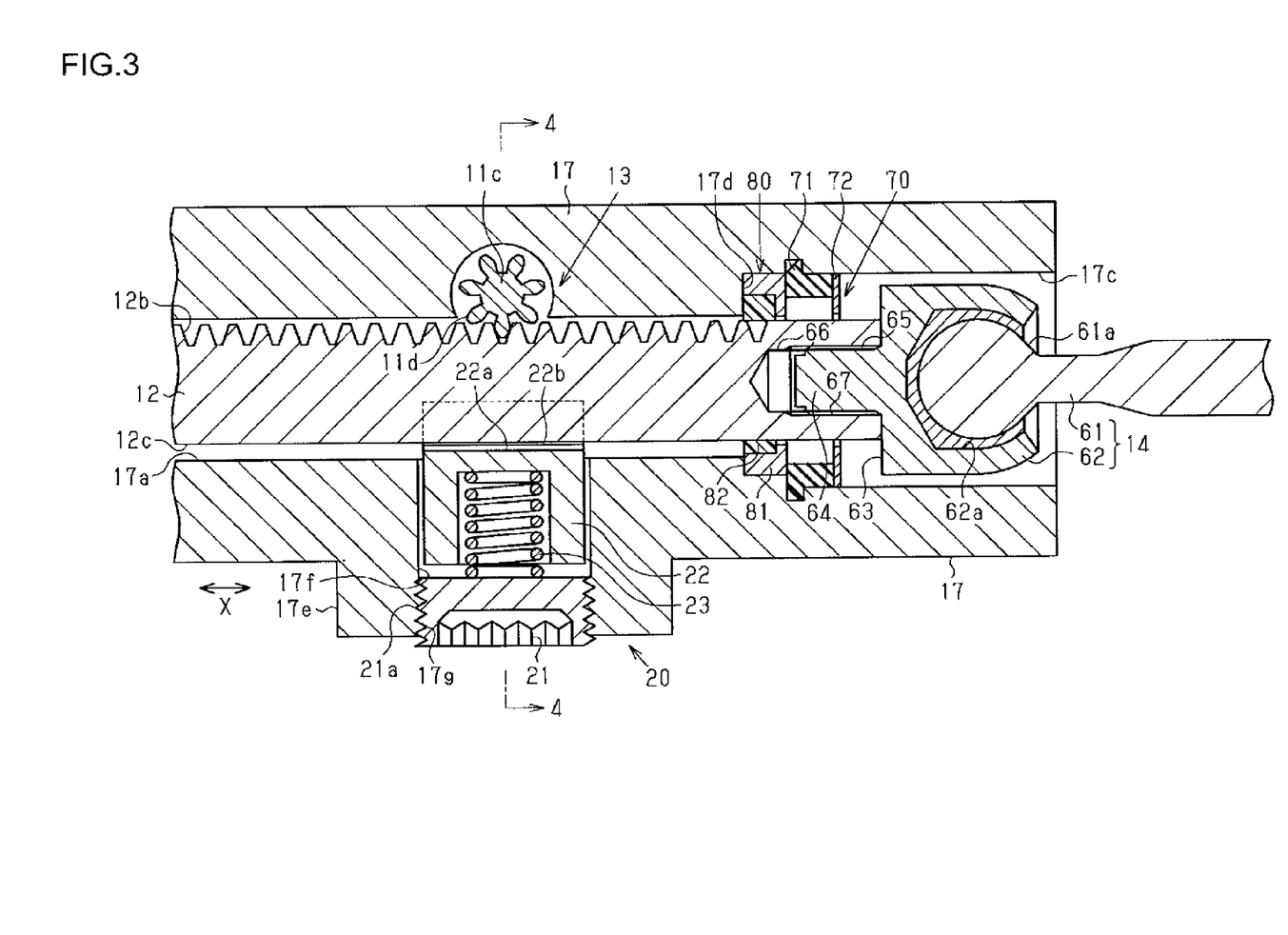
FIG. 3 is a sectional view illustrating a schematic structure around a rack end and a rack guide of the steering device according to the embodiment.

As illustrated in FIG. 3, the rack end 14 is a so-called ball joint, and has a ball stud 61 with a ball portion 61a provided at the distal end, and a socket 62 that houses the ball portion 61a so that the ball portion 61a is turnable and bendable. A spherical seat 62a that corresponds to the spherical shape of the ball portion 61a is mounted inside the socket 62. The ball stud 61 is coupled so as to be bendable with respect to the socket 62 with the ball portion 61a fitted with the spherical seat 62a. An end portion of the tie rod 15 on the side opposite to the steered wheel 16 is fixed to an end portion of the ball stud 61 on the side opposite to the ball portion 61a so that the tie rod 15 is coupled so as to be bendable with respect to the rack shaft 12.

The rack end 14 is fixed to the rack shaft 12 with the socket 62 threadably engaged with an end portion of the rack shaft 12. A circular column portion 64 that projects toward the rack shaft 12 is provided on an end surface 63 of the socket 62 on the rack shaft 12 side. An external thread portion 65 is provided on the outer peripheral surface of the circular column portion 64. Meanwhile, a circular hole 66 that is concentric with the rack shaft 12 is provided at an end portion of the rack shaft 12. An internal thread portion 67 that corresponds to the external thread portion 65 is provided in the inner peripheral surface of the circular hole 66. The socket 62 is fixed to an end portion of the rack shaft 12 with the external thread portion 65 threadably engaged with the internal thread portion 67. The end surface 63 of the socket 62 abuts against an end surface of the rack shaft 12.

An increased diameter portion 17c for insertion of the socket 62 is provided at an end portion of the rack housing 17. The inside diameter of the increased diameter portion 17c is set to be larger than the inside diameter of the insertion portion 17a. A restricting surface 17d that is orthogonal to the axial direction X is provided at the boundary portion between the insertion portion 17a and the increased diameter portion 17c. The outside diameter of the socket 62 is set to be larger than the inside diameter of the insertion portion 17a of the rack housing 17, and smaller than the inside diameter of the increased diameter portion 17c. Therefore, there occurs so-called end abutment, in which the end surface 63 abuts against the restricting surface 17d (to be exact, the end surface 63 presses against the restricting surface 17d via a shock absorption member 70 and a rotation stopping member 80 in the embodiment) as the rack shaft 12 is moved. In order to relieve a shock during the end abutment, therefore, the shock absorption member 70 is provided between the restricting surface 17d of the rack housing 17 and the end surface 63 of the rack end 14.

The shock absorption member 70 has a cylindrical elastic portion 71 and an annular end plate 72. The end plate 72 is maintained in the state of contacting a first end surface of the elastic portion 71, which is an end surface on the side opposite to the restricting surface 17d. A second end surface of the elastic portion 71 is maintained in the state of contacting the restricting surface 17d.

Figure 4:
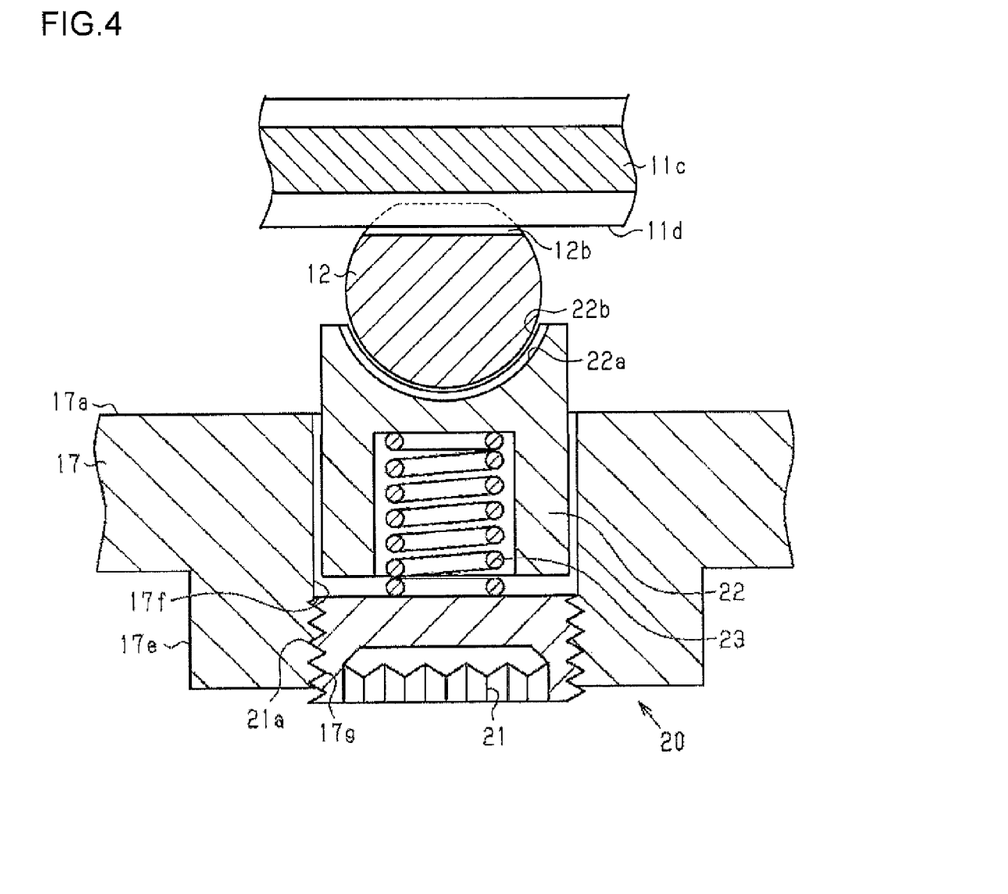
FIG. 4 is a schematic sectional view taken along the line 4-4 of FIG. 3.

Next, the rack guide 20 will be described. As illustrated in FIGS. 3 and 4, the rack-and-pinion mechanism 13 is configured with pinion teeth 11d, which are provided at the distal end of the pinion shaft 11c, and rack teeth 12b, which are provided on the rack shaft 12, meshed with each other. A back surface 12c of the rack shaft 12 on the side opposite to the rack teeth 12b has a semi-cylindrical shape (semi-arcuate shape in section).

A portion of the outer peripheral surface of the rack housing 17 corresponding to the back surface 12c of the rack shaft 12 is provided with a tubular guide attachment portion 17e. The guide attachment portion 17e is provided with a housing hole 17f for communication between the inside and the outside of the rack housing 17. The rack guide 20 is fixed to the guide attachment portion 17e with the rack guide 20 housed in the housing hole 17f. The rack guide 20 has a plug 21, a support yoke 22, and an urging member 23.

The plug 21 is positioned at an opening portion of the housing hole 17f. External threads 21a are provided on the outer peripheral surface of the plug 21. The plug 21 is fixed to the rack housing 17 (guide attachment portion 17e) by threadably engaging the external threads 21a with internal threads 17g provided in the inner peripheral surface of the housing hole 17f. The position of insertion of the plug 21 into the housing hole 17f is adjusted by adjusting the amount of the threadable engagement between the internal threads 17g and the external threads 21a.

The support yoke 22 is pressed by the plug 21 via the urging member 23. The support yoke 22 is provided so as to be movable back and forth with respect to the plug 21. The support yoke 22 supports the rack shaft 12 so that the rack shaft 12 is movable in the axial direction X. The support yoke 22 has a guide surface 22a that corresponds to the shape of the back surface 12c of the rack shaft 12. The guide surface 22a serves as an abutment surface for abutment of the support yoke 22 with the rack shaft 12, and functions as a receiving portion for the rack shaft 12. In addition, a sheet member 22b is provided between the guide surface 22a and the back surface 12c. The interposition of the sheet member 22b reduces the sliding resistance between the rack shaft 12 and the guide surface 22a for a case where the rack shaft 12 is moved in the axial direction X. A material such as a resin with good wear resistance (e.g. with high self-lubrication) is adopted for the sheet member 22b. Consequently, wear of the rack shaft 12 and the support yoke 22 is suppressed.

A coil spring, for example, is adopted as the urging member 23. The support yoke 22 is always urged toward the back surface 12c by the elastic force of the urging member 23. The guide surface 22a is always maintained in the state of abutting against the back surface 12c via the sheet member 22b by the elastic force of the urging member 23. In addition, the urging member 23 is urged in the direction of pressing the rack shaft 12 against the pinion shaft 11c via the support yoke 22. Consequently, the support yoke 22 is pressed against the rack shaft 12 to secure meshing between the rack teeth 12b of the rack shaft 12 and the pinion teeth 11d of the pinion shaft 11c. The urging force of the urging member 23, that is, the force with which the support yoke 22 is pressed against the rack shaft 12, can be adjusted by adjusting the position of insertion of the plug 21 into the housing hole 17f.

Next, the rotation stopping member which is configured to suppress rotation of the rack shaft 12 in the circumferential direction will be described. As illustrated in FIG. 3, the rotation stopping member 80 is provided between the inner wall surface of the insertion portion 17a and the outer peripheral surface (outer wall surface) of the rack shaft 12, and between the restricting surface 17d and the shock absorption member 70 in the axial direction of the rack shaft 12. Put in another expression, the rotation stopping member 80 is provided between an end surface of the rack housing 17 that abuts against the rack end 14 (to be exact, an end surface of the rack housing 17 that would originally abut against the rack end 14) and the rack-and-pinion mechanism 13 (rack guide 20) in the axial direction of the rack shaft 12. In addition, the rotation stopping member 80 is fitted with the inner wall surface of the rack housing 17 to be fixed to the rack housing 17.

In the case where the rack housing 17 is constructed by assembling a plurality of divided housings, one of the divided housings is preferably provided with the rack guide 20, the rack end 14, and the rotation stopping member 80. In addition, the rotation stopping member 80 is preferably provided in the vicinity of the rack guide 20. This is because a portion of the rack shaft 12 between the rotation stopping member 80 and the rack guide 20 may be twisted in the case where the rotation stopping member 80 and the rack guide 20 are distanced from each other.

Figure 5A:
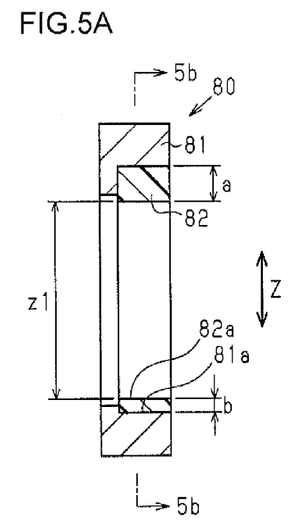
FIG. 5A is a side view illustrating a schematic configuration of a rotation stopping member of the steering device according to the embodiment.
Figure 5B:
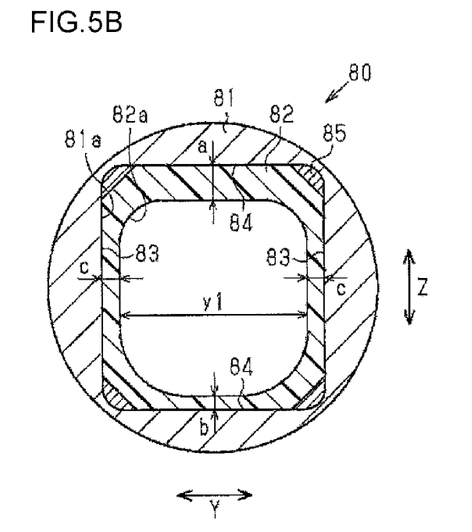
FIG. 5B is a front view illustrating a schematic configuration of the rotation stopping member of the steering device according to the embodiment.

As illustrated in FIGS. 5A and 5B, the rotation stopping member 80 has a case 81 and a low-friction member 82. The case 81 has a generally cylindrical shape. As seen in the axial direction of the rack shaft 12, the outer peripheral surface of the case 81 has a circular shape, and a hollow portion 81$a$ in a rectangular shape with four rounded corners is provided inside the case 81. The hollow portion 81$a$ has two flat surface portions 83 that face each other in a direction Y (the depth direction in FIG. 1) and extend in parallel with each other, and two flat surface portions 84 that face each other in a direction Z (the up-down direction in FIG, 1) and extend in parallel with each other. The flat surface portions 83 and the flat surface portions 84 are orthogonal to each other. Fixation members 85 for fixation of the low-friction member 82 are provided at the four rounded corners (portions at which the flat surface portions 84 and the flat surface portions 83 cross each other) of the hollow portion 81$a$. The low-friction member 82 is provided over the entire periphery of the case 81 so as to extend along the inner peripheral shape of the case 81 (to be exact, the case 81 and the fixation member 85). That is, the outer peripheral shape of the low-friction member 82 corresponds to the inner peripheral shape of the case 81. The low-friction member 82 is provided with a hollow portion 82$a$ in a rectangular shape with four rounded corners. The length of an unrounded portion of the hollow portion 82$a$ in the direction Y is set to a length y1. In addition, the length of an unrounded portion of the hollow portion 82$a$ in the direction Z is set to a length z1.

By way of example, the material of the case 81 is substantially equal in thermal expansion rate to the rack housing 17 (the difference between the thermal expansion rates of the case 81 and the rack housing 17 is smaller than a threshold). Therefore, fixation between the case 81 and the rack housing 17 is less easily loosened even in the case where temperature variations are caused.

A first portion (on the upper side in FIG. 5A), which is unrounded, of the low-friction member 82 has a thickness a in the direction Z. A second portion (on the lower side in FIG. 5A), which is unrounded, of the low-friction member 82 has a thickness b in the direction Z. The thickness a is set to be larger than the thickness b. In addition, the thickness of both unrounded portions of the low-friction member 82$a$ in the direction Y is set to a thickness c. The distance between the two flat surface portions 83 of the case 81 is represented by the sum of the length y1 and twice the thickness c. A material such as a resin with good wear resistance and low friction (a low frictional resistance) is adopted for the low-friction member 82. By way of example, crystalline plastic with high self-lubrication or the like is adopted. In addition, the same material as that of the rack housing 17, for example, is adopted for the case 81. In FIGS. 5A and 5B, the low-friction member 82 is illustrated as being large in an exaggerated manner.

The length (thickness) of the rotation stopping member 80 in the axial direction is preferably as long as possible from the viewpoint of supporting the rack shaft 12. If the length of the rotation stopping member 80 in the axial direction is too long, however, the sliding resistance between the rack shaft 12 and the rotation stopping member 80 (low-friction member 82) may be increased. If the length of the rotation stopping member 80 in the axial direction is too short, on the contrary, it is difficult to secure the strength for the rotation stopping member 80 to support the rack shaft 12. The length of the rotation stopping member 80 in the axial direction is set to an optimum value from such viewpoints.

Figure 6A:
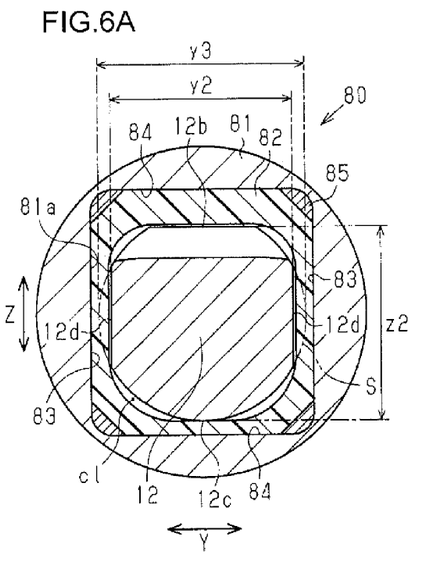
FIG. 6A is a schematic view illustrating a schematic structure of the steering device according to the embodiment for a case where there is a clearance between the rotation stopping member and a rack shaft.

As illustrated in FIG. 6A, two flat surface portions 12$d$ are provided on portions of the rack shaft 12 away from the rack teeth 12$b$ and the back surface 12$c$ in the circumferential direction. The two flat surface portions 12$d$ are parallel to each other. That is, the two flat surface portions 12$d$ are shaped to have a width across flats. In addition, the two flat surface portions 12$d$ are provided so as be orthogonal to the rack teeth 12$b$. Therefore, the two flat surface portions 12$d$ can be provided away from the rack teeth 12$b$ and the back surface 12$c$, which facilitates securing the areas of the rack teeth 12$b$ and the back surface 12$c$. As illustrated in FIG. 1, the flat surface portions 12$d$ are provided over a certain range over which the rack shaft 12 is assumed to be moved in the axial direction X with reference to the right end portion of the rack shaft 12. By way of example, the flat surface portions 12$d$ are provided by cutting away the original cylindrical shape (cylindrical surface) S of the rack shaft 12, which is indicated by the dot-and-dash line in FIG. 6A, along the direction Z.

In this case, the flat surface portions 12$d$ are provided on the inner side with respect to the original cylindrical shape S (an extended curved surface obtained by extending the semi-cylindrical shape of the back surface 12$c$) of the rack shaft 12. Therefore, the maximum length of the rack shaft 12 in the direction Y is a length y2 for the rack shaft 12 which is provided with the flat surface portions 12$d$, in contrast to a length y3 for the original rack shaft 12. The length y2 is set to be smaller than the length y3.

The rotation stopping member 80 is disposed on the outer peripheral surface of the rack shaft 12. That is, the rack shaft 12 is inserted into the hollow portion 82$a$ which is provided in the low-friction member 82 of the rotation stopping member 80. In this event, the rack shaft 12 is assembled to the case 81 such that the flat surface portions 12$d$ of the rack shaft 12 correspond to the flat surface portions 83 of the case 81.

The length y1 of the hollow portion 82$a$ of the rotation stopping member 80 (low-friction member 82) in the direction Y is set to be slightly larger than the length y2 between the two flat surface portions 12$d$ of the rack shaft 12 in the direction Y. In addition, the length y1 is set to be smaller than the maximum length y3 of the original cylindrical shape S of the rack shaft 12 in the direction Y. In addition, the length z1 of the hollow portion 82$a$ of the rotation stopping member 80 (low-friction member 82) in the direction Z is set to be slightly larger than a length z2 between the rack teeth 12$b$ and the back surface 12$c$ of the rack shaft 12 in the direction Z. That is, a slight clearance c1 is provided between the outer surface (outer peripheral surface) of the rack shaft 12 and the inner surface (inner peripheral surface) of the rotation stopping member 80 (low-friction member 82). By way of example, FIG. 6A illustrates a state in which the clearance c1 is provided generally uniformly between the outer surface of the rack shaft 12 and the inner surface of the rotation stopping member 80.

Figure 6B:
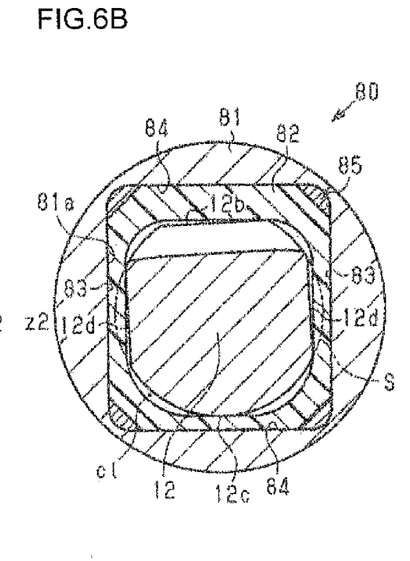
FIG. 6B is a schematic view illustrating a schematic structure of the steering device according to the embodiment for a case where rotation of the rack shaft is suppressed by the rotation stopping member.

As illustrated in FIG. 6B, when the rack shaft 12 is rotated in the circumferential direction, the rack shaft 12 abuts against the case 81 via the low-friction member 82 so that rotation of the rack shaft 12 in the circumferential direction is restricted. That is, the rack shaft 12 is rotated in the circumferential direction within the range of the clearance e1 which is provided between the outer surface of the rack shaft 12 and the inner surface of the rotation stopping member 80, and rotation of the rack shaft 12 in the circumferential direction is restricted when the clearance c1 is eliminated with the rack shaft 12 abutting against the case 81 via the low-friction member 82. With the flat surface portions 12d provided, in addition, rotation of the rack shaft 12 is restricted when the rack shaft 12 abuts against the flat surface portions 83 via the low-friction member 82 when the rack shaft 12 is rotated. That is, rotation of the rack shaft 12 is restricted with the flat surface portions 12d, which serve as a first abutment portion, abutting against the flat surface portions 83, which serve as a second abutment portion. For example, with the original cylindrical shape S of the rack shaft 12, rotation of the rack shaft 12 is not suppressed, since the rack shaft 12 has no catchy portion, even if the rack shaft 12 is rotated and abuts against the flat surface portions 83. The rotation stopping member 80 is fixed with respect to the rack housing 17, and therefore rotation of the rotation stopping member 80 that accompanies rotation of the rack shaft 12 is restricted.

Figure 7:
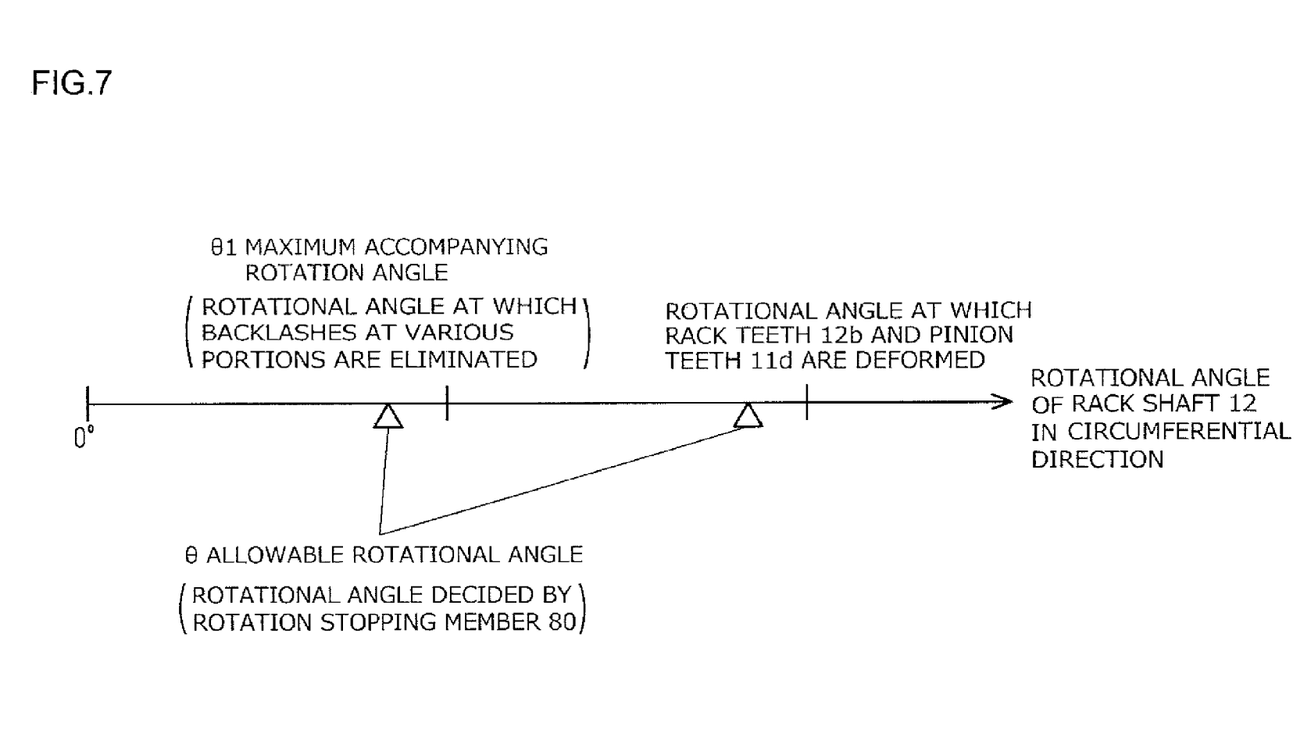
FIG. 7 is a schematic diagram illustrating the relationship between the rotational angle of the rack shaft in the circumferential direction and an allowable rotational angle.

As illustrated in FIG. 7, for convenience, the maximum rotational angle over which the rack shaft 12 can be rotated in the circumferential direction with restriction by the rotation stopping member 80 is defined as an allowable rotational angle θ. The rotation stopping member 80 is provided such that the allowable rotational angle θ is smaller than that in a configuration according to the related art in which no rotation stopping member 80 is provided. As illustrated in FIG. 6B, the rotation stopping member 80 adjusts the clearance c1 such that the allowable rotational angle θ is smaller, although discussed in detail later. In the case where there is completely no clearance c1, there may occur a disadvantage that the clearance between the support yoke 22 and the plug 21 cannot be adjusted. The allowable rotational angle θ is estimated in accordance with a variety factors including those described above, and the clearance c1 is decided in order to make the allowable rotational angle θ smaller.

With a configuration according to the related art with no rotation stopping member 80, the rack shaft 12 is not only rotated in the circumferential direction by rotational torque from the motor 30 in normal situations, but also rotated in the circumferential direction more significantly even in abnormal situations. Examples of the normal situations include a situation in which end abutment or the like is not caused. Examples of the abnormal situations include a situation in which end abutment is caused after the steering wheel is turned rapidly as the vehicle rides on a curb. Therefore, the rotation stopping member 80 is provided so as to suppress both rotation of the rack shaft 12 in the circumferential direction, which continuously occurs each time steering is performed, and significant rotation of the rack shaft 12 in the circumferential direction at the time of end abutment after the vehicle rides on a curb, which rarely occurs.

A situation in which the rack shaft 12 may be rotated will be described in detail. First, rotation of the rack shaft 12 caused in the case where steering is performed in normal situations will be described. As illustrated in FIG. 2, rotational torque applied from the motor 30 is transferred to the ball screw mechanism 40 (nut 41) via the speed reducer 50. When rotational torque is applied to rotate the nut 41, a large portion of the rotational torque is converted into a force that moves the rack shaft 12 in the axial direction X. However, the remaining small portion of the rotational torque acts as a force that rotates the rack shaft 12 in the circumferential direction (in an accompanying manner) as the nut 41 is rotated.

Figure 8:
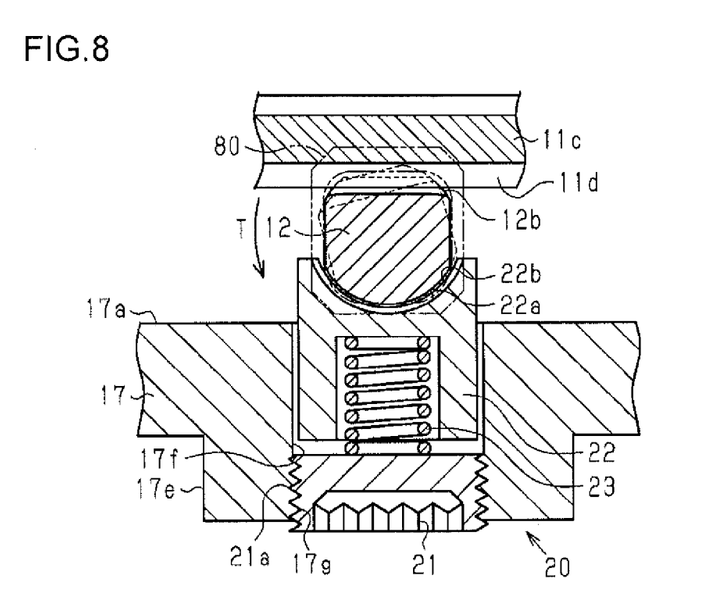
FIG. 8 is a schematic view illustrating a state in which rotation of the rack shaft is suppressed by the rotation stopping member.

As indicated by the dashed line in FIG. 8, in the case of a comparative example in which the rotation stopping member 80 is not provided, the rack shaft 12 is rotated in the circumferential direction in an accompanying manner by the rotational torque applied from the motor 30. That is, torque T acts on the rack shaft 12 because of the rotational torque applied from the motor 30, and the rack shaft 12 is urged to be rotated in the direction in which the torque T acts. In the comparative example, the rack shaft 12 is not supported in the circumferential direction, and the rack shaft 12 is rotated (tilted) in the circumferential direction. In this event, a part of the rack teeth 12b is strongly meshed with the pinion teeth 11d, while another part of the rack teeth 12b is weakly meshed with the pinion teeth 11d. In the illustration of FIG. 8, the urging member 23 is hardly compressed even in the case where the rack shaft 12 is rotated to be moved in the direction of compressing the urging member 23.

In the embodiment, in contrast, as indicated by the continuous line in FIG. 8, the rotation stopping member 80 is provided, and the rack shaft 12 is rotated in an accompanying manner only to the allowable rotational angle θ even in the case where rotational torque is applied from the motor 30. When the rack shaft 12 is urged to be rotated in an accompanying manner in the circumferential direction, the rack shaft 12 abuts against the rotation stopping member 80 (low-friction member 82), and rotation of the rack shaft 12 in the circumferential direction exceeding the allowable rotational angle θ is suppressed. Therefore, occurrence of a portion in which meshing between the rack teeth 12b and the pinion teeth 11d is too strong is suppressed.

Next, rotation of the rack shaft 12 caused in abnormal situations will be described. In abnormal situations, torque T2 which is larger than the torque T which is generated by steering in normal situations illustrated in FIG. 8 acts on the rack shaft 12. Examples of the case where the torque T2 acts include a case where a large load acts on the rack shaft 12 because of end abutment after the vehicle rides on a curb.

Figure 9:
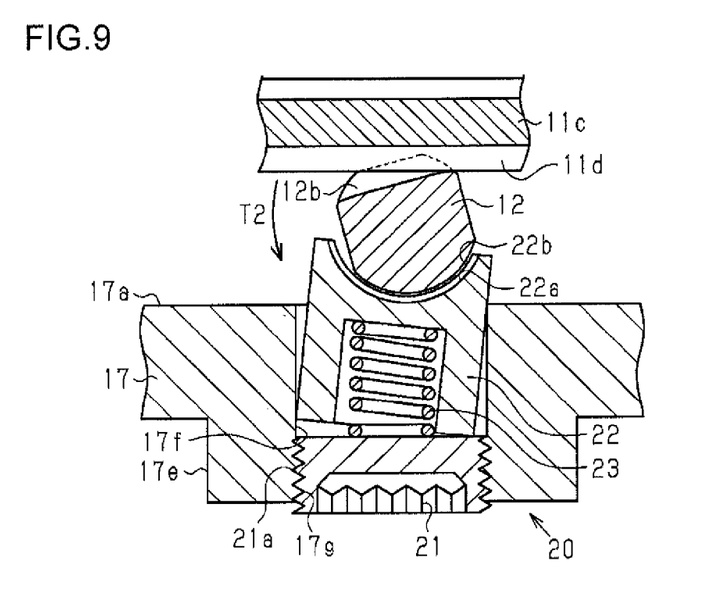
FIG. 9 is a schematic view illustrating a state in which a clearance between a yoke and a plug is eliminated by rotation of the rack shaft.

As indicated by the continuous line in FIG. 9, the rack shaft 12 is urged to be rotated in the case where the torque T2 acts on the rack shaft 12. As the rack shaft 12 is rotated, the rack shaft 12 is pressed against the support yoke 22 so as to compress the urging member 23. The rack shaft 12 is moved toward the support yoke 22 within the range of expansion and contraction of the urging member 23. When the support yoke 22 is pressed against the plug 21, the rack shaft 12 is not rotated any more in the circumferential direction. In the illustration of FIG. 9, the torque T2 acts to rotate the rack shaft 12 to be moved such that the urging member 23 is compressed sufficiently. In this event, there occur a portion in which the rack teeth 12b and the pinion teeth 11d are meshed with each other and a portion in which the rack teeth 12b and the pinion teeth 11d are not meshed with each other. In other words, the rack teeth 12b and the pinion teeth 11d abut against each other partially in a portion of the range in which the teeth are provided.

When the rack shaft 12 is further rotated in the circumferential direction, the rack teeth 12b and the pinion teeth 11d may be deformed. In order to suppress deformation of the rack teeth 12b and the pinion teeth 11d, it is necessary to increase the size of the rack teeth 12b and the pinion teeth 11d, which may increase the weight and the cost. In the embodiment, the rack shaft 12 abuts against the rotation stopping member 80 before the rack teeth 12b and the pinion teeth 11d are deformed, which restricts rotation of the rack shaft 12 in the circumferential direction. Therefore, deformation of the rack teeth 12b and the pinion teeth 11d is suppressed, which suppresses an increase in weight and cost that accompanies an increase in size of the rack teeth 12b and the pinion teeth 11d.

Next, with reference to FIG. 7, a maximum accompanying rotation angle θ1 decided in accordance with backlashes at various portions of the steering mechanism 2 will be described in detail. The maximum accompanying rotation angle θ1 is an angle decided in accordance with a variety of factors. The maximum accompanying rotation angle θ1 is decided in accordance with first to fourth factors, in particular.

The first factor is a backlash (amount of movement) of the support yoke 22 in a space surrounded by the rack housing 17 and the plug 21. This backlash is decided in accordance with the clearance in the radial direction between the inner wall surface (inner peripheral surface) of the housing hole 17f of the rack housing 17 and the outer wall surface (outer peripheral surface) of the support yoke 22 and the clearance in the axial direction between the plug 21 and the support yoke 22.

The second factor is a backlash (amount of movement) in the axial direction of the pinion shaft 11c with respect to the rack housing 17. This backlash is decided in accordance with a backlash of the bearing 19 itself, a backlash (clearance) between the pinion shaft 11c and the bearing 19, and a backlash (clearance) between the bearing 19 and the rack housing 17.

The third factor is a backlash (amount of movement) in the radial direction of the pinion shaft 11c with respect to the rack housing 17. This backlash is decided in accordance with a backlash of the bearing 19 itself, a backlash (clearance) between the pinion shaft 11c and the bearing 19, and a backlash (clearance) between the bearing 19 and the rack housing 17, as with the second factor.

The fourth factor is the meshing state (to be exact, a local clearance) between the rack teeth 12b and the pinion teeth 11d in the rack-and-pinion mechanism 13. For example, in the case where there is a backlash (clearance) between the rack teeth 12b and the pinion teeth 11d, the rack shaft 12 can be moved with respect to the pinion shaft 11c (e.g. the rack shaft 12 can be rotated in the circumferential direction). Since the rack shaft 12 is pressed against the pinion shaft 11c by the rack guide 20, the amount of movement generated by the fourth factor is marginal.

The maximum accompanying rotation angle θ1 of the rack shaft 12 is decided in accordance with the first to fourth factors. In general, the maximum accompanying rotation angle θ1 becomes larger as the first to fourth factors become larger. In order to make the rotational angle of the rack shaft 12 in the circumferential direction smaller than the maximum accompanying rotation angle θ1 which is decided in accordance with such factors, the rack shaft 12 is provided with the flat surface portions 12d, and the rotation stopping member 80 against which the rack shaft 12 abuts when the rack shaft 12 is rotated is provided.

According to the embodiment, the following functions and effects can be obtained.

(1) When the rack shaft 12 is urged to be rotated along with rotational torque applied from the motor 30, the flat surface portions 12d of the rack shaft 12 abut against the rotation stopping member 80. Therefore, rotation of the rack shaft 12 is suppressed. The allowable rotational angle θ for a case where the rotation stopping member 80 is provided is smaller than the maximum accompanying rotation angle θ1 of the rack shaft 12 for a case where the rotation stopping member 80 is not provided. Therefore, a non-uniform load that is applied to the rack teeth 12b and the pinion teeth 11d by rotation of the rack shaft 12 is small, and uneven wear of the rack teeth 12b and the pinion teeth 11d even after a long period of use is suppressed.

In addition, the clearance c1, which is provided between the rotation stopping member 80 and the rack shaft 12, allows the rack shaft 12 to be moved (rotated and translated) slightly, and also allows the support yoke 22 to support the rack shaft 12 while moving back and forth.

(2) Even in the case where a large load acts on the rack shaft 12 because of end abutment after the vehicle rides on a curb, for example, the flat surface portions 12d of the rack shaft 12 abut against the flat surface portions 83 of the rotation stopping member 80, which restricts rotation of the rack shaft 12 in the circumferential direction. Therefore, destruction of the rack teeth 12b and the pinion teeth 11d is suppressed.

(3) The sliding resistance between the rotation stopping member 80 and the rack shaft 12 can be reduced by providing the low-friction member 82 on the inner surface of the case 81.

(4) A material that is substantially equal in thermal expansion rate to that of the rack housing 17 is used as the material of the case 81. Therefore, fixation between the rotation stopping member 80 (case 81) and the rack housing 17 is not loosened even in the case where temperature variations are caused.

The embodiment may be modified as follows. The following other embodiments may be combined with each other as long as the embodiments do not technically contradict with each other. In the embodiment, the shock absorption member 70 is provided. However, the shock absorption member 70 may not be provided. For example, the shock absorption member 70 may not be provided if no problem occurs even if a shock of end abutment acts on the assist mechanism 3.

In the embodiment, the back surface 12c of the rack shaft 12 is formed in a semi-cylindrical shape. However, the present invention is not limited thereto. In the same manner, the guide attachment portion 17e also has a shape corresponding to the shape of the back surface 12c. However, the present invention is not limited thereto. For example, the back surface 12c may be formed in a triangular column shape, and the guide attachment portion 17e may be shaped so as to receive the triangular column shape of the back surface 12c.

In the embodiment, the support yoke 22 is provided with the sheet member 22b. However, the present invention is not limited thereto. The sheet member 22b may not be provided in the case where the sliding resistance between the rack shaft 12 and the guide surface 22a does not matter.

In the embodiment, the rotation stopping member 80 is provided in the vicinity of the rack guide 20 (rack-and-pinion mechanism 13). However, the present invention is not limited thereto. In the case where the rotation stopping member 80 is provided in the vicinity of the rack guide 20, a portion of the rack shaft 12 between the rotation stopping member 80 and the rack guide 20 is prevented from being twisted. However, the rotation stopping member 80 and the rack guide 20 may be distanced from each other if such twisting does not particularly matter. That is, the rotation stopping member 80 may be provided between one of both end surfaces of the rack housing 17 that abuts against the rack end 14 and the rack guide 20.

In the embodiment, the rotation stopping member 80 is provided with the low-friction member 82. However, the rotation stopping member 80 may not be provided with the low-friction member 82. For example, the rotation stopping member 80 may be disposed around the rack shaft 12 such that the case 81 directly abuts against the rack shaft 12 in the case where the sliding resistance between the rack shaft 12 and the case 81 does not matter (e.g. is sufficiently low).

In the embodiment, the two flat surface portions 12d are provided in parallel with each other. However, the present invention is not limited thereto. That is, the two flat surface portions 12d may be provided non-parallel to each other. For example, the second flat surface portion 12d may be provided slightly non-parallel to the first flat surface portion 12d. In addition, the two flat surface portions 83 may be non-parallel to each other, and the two flat surface portions 84 may be non-parallel to each other.

In the embodiment, the clearance c1 is provided between the rotation stopping member 80 and the rack shaft 12 by making the length y1 larger than the length y2. However, the clearance c1 may not be provided.

Figure 10A:
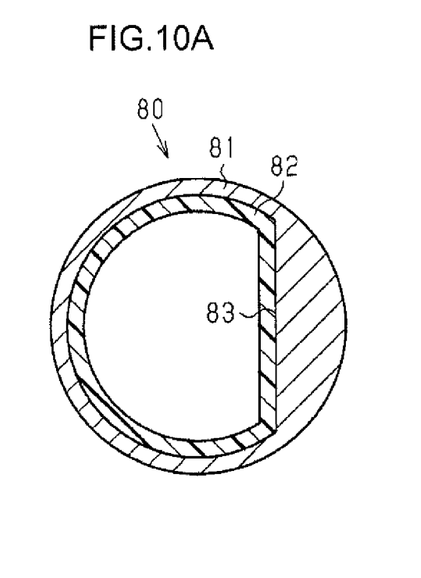
FIG. 10A is a schematic view illustrating a schematic structure of a rotation stopping member of a steering device according to another embodiment.

In the embodiment, the rotation stopping member 80 has two flat surface portions 83. However, the present invention is not limited thereto. As illustrated in FIG. 10A, the rotation stopping member 80 may have only one flat surface portion 83. In this case, the flat surface portion 12d of the rack shaft 12 also abuts against the flat surface portion 83 when the rack shaft 12 is rotated. Therefore, the allowable rotational angle θ can be reduced.

Figure 10B:
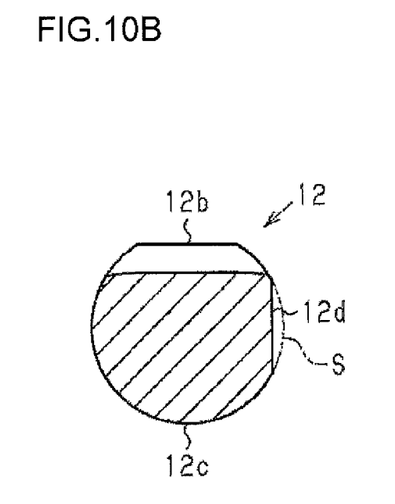
FIG. 10B is a schematic view illustrating a cross-sectional shape of a rack shaft in the axial direction of a steering device according to another embodiment.

In the embodiment, the rack shaft 12 has two flat surface portions 12d. However, the present invention is not limited thereto. As illustrated in FIG. 10B, the rack shaft 12 may have only one flat surface portion 12d.

Figure 10C:
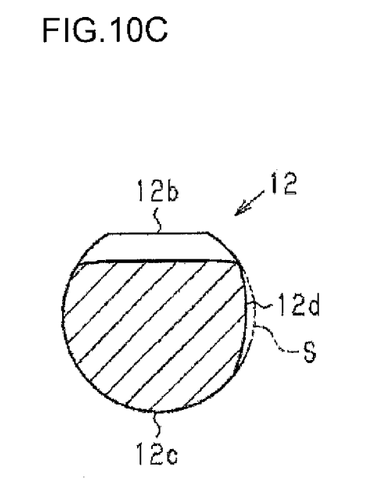
FIG. 10C is a schematic view illustrating a cross-sectional shape of a rack shaft in the axial direction of a steering device according to another embodiment.

In the embodiment, the flat surface portions 12d, 83, and 84 are flat surfaces. However, the flat surface portions 12d, 83, and 84 may be curved surfaces. For example, as illustrated in FIG. 10C, the flat surface portion 12d of the rack shaft 12 may be a curved surface. It should be noted, however, that the flat surface portions are set so that the flat surface portion 12d abuts against the flat surface portion 83 when the rack shaft 12 is rotated even in the case where the flat surface portions 12d, 83, 84 are curved surfaces. For example, the flat surface portion 12d in FIG. 10C is a curved surface with a curvature that is different from that of the original cylindrical shape S of the rack shaft 12.

Figure 10D:
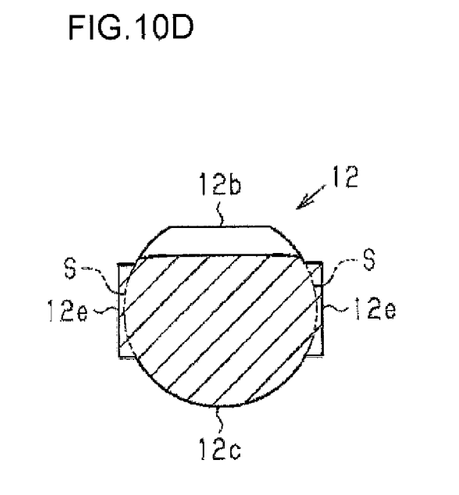
FIG. 10D is a schematic view illustrating a cross-sectional shape of a rack shaft in the axial direction of a steering device according to another embodiment.

In the embodiment, the flat surface portions 12d are provided on the inner side with respect to the original cylindrical shape S of the rack shaft 12. However, the present invention is not limited thereto. For example, as illustrated in FIG. 10D, flat surface portions that project outward with respect to the original cylindrical shape S may be provided.

In the embodiment, the case 81 is made of a material that is substantially the same in thermal expansion rate as that of the rack housing 17. However, the present invention is not limited thereto. For example, the case 81 and the rack housing 17 may be made of materials with different thermal expansion rates when the difference in thermal expansion rate between the case 81 and the rack housing 17 does not matter for fixation of the case 81 with respect to the rack housing 17 even in the case where there is such a difference.

In the embodiment, the present invention is embodied as the EPS device 1 which applies an assist force to the rack shaft 12 using the motor 30 which has the rotary shaft 31 which is disposed in parallel with the rack shaft 12. However, the present invention is not limited thereto. That is, the present invention may be embodied as a steering device that includes the ball screw mechanism 40. In addition, the present invention is applied to an electric power steering device that assists linear motion of the rack shaft 12, which occurs in conjunction with a steering operation, utilizing the rotational force of the motor 30. However, the present invention may be applied to a steer-by-wire (SBW) steering actuator. In the case where the present invention is embodied as an SBW steering actuator, the present invention may be embodied not only as a front-wheel steering device but also as a rear-wheel steering device or a four-wheel steering (4 WS) device. Above described SBW steering actuator may have a construction without the rack and pinion mechanism in addition to the construction with the rack and pinion mechanism.

What is claimed is:

1. A steering device comprising:
   a steering shaft that includes a pinion shaft that has pinion teeth;
   a steered shaft that is reciprocally movable in an axial direction and that has a portion in which a screw groove is provided in an outer periphery, the steered shaft being provided with a first abutment portion located at a position that is away from the screw groove in the axial direction of the steered shaft;
   a ball screw mechanism that has a cylindrical nut threadably engaged with the screw groove via a plurality of balls, the ball screw mechanism being configured to apply a force in the axial direction to the steered shaft on a basis of rotation of the nut;
   a motor that applies rotational torque to the nut;
   a rack housing that has an insertion portion through which the steered shaft is inserted;
   a rack end mounted to each of both end portions of the steered shaft and coupled to a steered wheel; and
   a rotation stopping member provided between an outer peripheral surface of the steered shaft and an inner peripheral surface of the insertion portion and between an end surface of the rack housing against which the rack end abuts and the ball screw mechanism in the axial direction of the steered shaft, the rotation stopping member having a second abutment portion that faces the first abutment portion via a clearance and that abuts against the first abutment portion when the steered shaft is rotated in the circumferential direction.

2. A steering device according to claim 1,
   wherein the steered shaft has a portion provided with rack teeth meshed with the pinion teeth at different position from the screw groove in the axial direction, the steered shaft being provided with the first abutment portion located at a position that is away from the rack teeth and a back surface of the steered shaft in a circumferential direction about a center axis of the steered shaft, and is away from the screw groove in the axial direction of the steered shaft;
   the rack teeth and the pinion teeth constitute a rack-and-pinion mechanism that converts rotation of the steering shaft into reciprocal linear motion of the steered shaft through meshing between the pinion teeth and the rack teeth;
   the rotation stopping member is provided between an outer peripheral surface of the steered shaft and an inner peripheral surface of the insertion portion and between an end surface of the rack housing against which the rack end abuts and the rack-and-pinion mechanism in the axial direction of the steered shaft.

3. The steering device according to claim 1, wherein:
   the first abutment portion includes two flat surface portions that extend in parallel with each other; and
   the second abutment portion includes two flat surface portions that extend in parallel with each other.

4. The steering device according to claim 3, wherein:
the back surface of the steered shaft is a cylindrical surface;
the two flat surface portions provided on the steered shaft are provided on an inner side with respect to an extended curved surface of the cylindrical surface as the back surface of the steered shaft as seen in the axial direction; and
a distance between the two flat surface portions provided on the rotation stopping member is set to be larger than a distance between the two flat surface portions provided on the steered shaft, and smaller than an outside diameter of the extended curved surface of the cylindrical surface as the back surface of the steered shaft as seen in the axial direction.

5. The steering device according to claim 2, wherein:
the rotation stopping member restricts a rotational angle of the steered shaft in the circumferential direction to an allowable rotational angle or less; and
the clearance between the first abutment portion of the steered shaft and the second abutment portion of the rotation stopping member is set such that the allowable rotational angle is smaller than a rotational angle of the steered shaft in the circumferential direction at which the rack teeth of the steered shaft and the pinion teeth of the pinion shaft are deformed.

6. The steering device according to claim 2, wherein the first abutment portion provided on the steered shaft is provided at a position at which the first abutment portion is orthogonal to the rack teeth in the circumferential direction of the steered shaft.

7. The steering device according to claim 2, wherein the rotation stopping member is provided between an end surface of the rack housing in the axial direction that is close to the rack-and-pinion mechanism and the rack-and-pinion mechanism, and in a vicinity of the rack-and-pinion mechanism.

8. The steering device according to claim 1, wherein a low-friction member made of a material that is lower in frictional resistance than the rack housing is disposed on an inner peripheral surface of the rotation stopping member.

9. The steering device according to claim 1, wherein the rotation stopping member and the rack housing have approximately the same thermal expansion rate.

10. The steering device according to claim 2, wherein;
the insertion portion is provided with a housing hole that penetrates to an outside of the rack housing;
a center line of the housing hole is provided so as to be orthogonal to a center line of the insertion portion;
the steering device has a rack guide that includes a plug attached to an inner wall portion of the housing hole and an end portion of the housing hole close to the outside, a support yoke that is provided so as to be movable back and forth with respect to the plug and that supports the steered shaft so that the steered shaft is slidable in the axial direction, and an urging member disposed between the support yoke and the plug to urge the support yoke toward the steered shaft;
the rotation stopping member restricts a rotational angle of the steered shaft in the circumferential direction to an allowable rotational angle or less; and
the allowable rotational angle of the steered shaft, which is decided in accordance with the clearance between the first abutment portion and the second abutment portion, is set to be smaller than a maximum accompanying rotation angle, which is decided in accordance with a first factor which is a clearance in the axial direction between the support yoke and the plug and a clearance in a radial direction between the support yoke and the housing hole, a second factor which is a backlash in the axial direction of the pinion shaft with respect to the rack housing, a third factor which is a backlash in the radial direction of the pinion shaft with respect to the rack housing, and a fourth factor which is a clearance between meshed portions of the pinion shaft and the steered shaft, the maximum accompanying rotation angle being an angle to which the steered shaft has been rotated in the circumferential direction until the clearances and the backlashes are eliminated.

11. The steering device according to claim 10, wherein the second factor and the third factor are decided in accordance with a backlash of a bearing itself, the bearing being configured to support the pinion shaft so that the pinion shaft is rotatable with respect to the rack housing, a clearance between the pinion shaft and the bearing, and a clearance between the bearing and the rack housing.

* * * * *